Nov. 19, 1935.    P. A. BORDEN    2,021,168
DEVICE FOR DAMPING OSCILLATIONS IN INSTRUMENTS
Filed Jan. 27, 1934
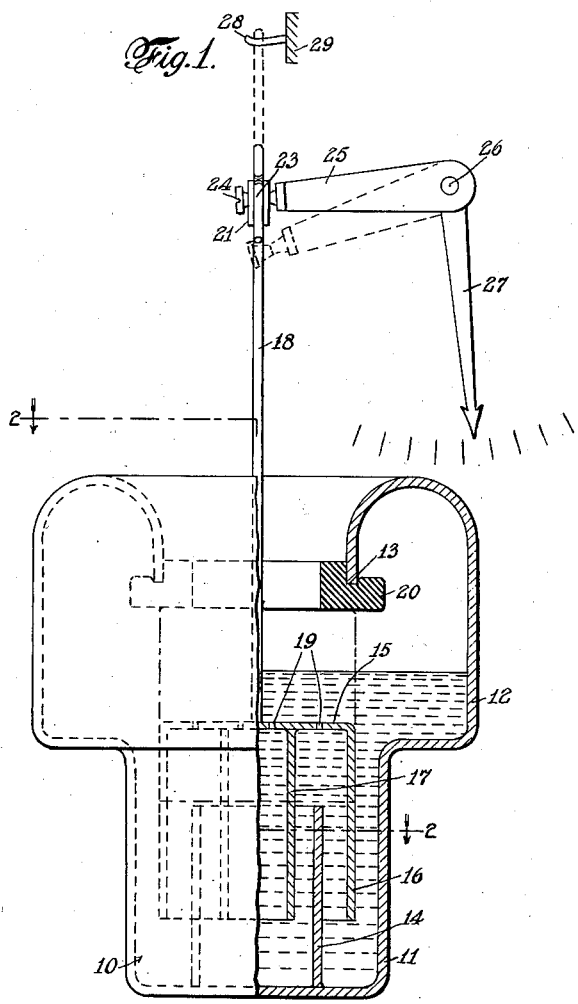
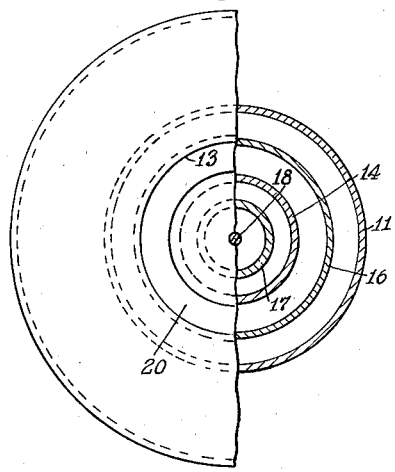
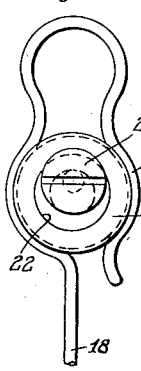
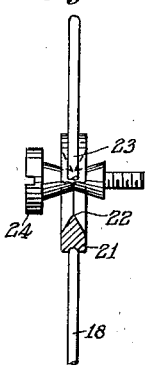
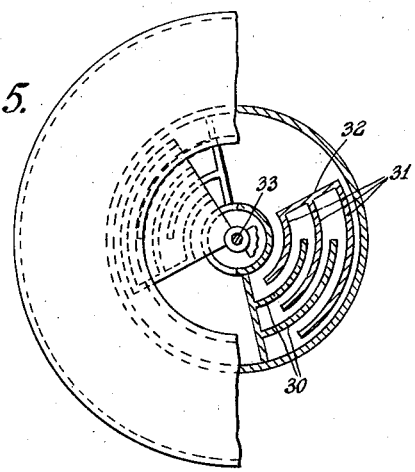
INVENTOR
PERRY A. BORDEN
BY
ATTORNEY Patented Nov. 19, 1935

2,021,168

UNITED STATES PATENT OFFICE 2,021,168

DEVICE FOR DAMPING OSCILLATIONS IN INSTRUMENTS

Perry A. Borden, Waterbury, Conn., assignor to The Bristol Company, Waterbury, Conn., a corporation of Connecticut Application January 27, 1934, Serial No. 708,711

5 Claims. (Cl. 188—94)

This invention relates to damping devices for measuring instruments and the like, and more particularly to dampers in which the phenomenon of fluid friction is utilized for annulling the oscillations of a moving element of the unit attendant upon the measuring of rapidly varying magnitudes.

In measuring instruments, particularly of the electrical type, where the actuating forces are relatively small, and where it becomes necessary to damp out oscillations of the moving part, it is essential that the damping device be substantially free of friction between solid members. Thus, where fluid type dampers are used, mechanical contact is inadmissible between the containing chamber or dashpot for the fluid and the member, such as a piston or plunger actuated by the moving element of the measuring instrument. This necessitates a clearance between these parts; and, while the flow of the damping fluid through this clearance is utilized to control the speed of deflection of the moving element, effective damping frequently requires that either the clearance be very minute, the fluid of undesirably high viscosity, or the damping device of objectionably large dimensions.

Furthermore, the use of liquids in damping, while technically desirable, has been open to the objection that most damping devices of this nature make little or no provision against spilling of the liquid, so that when the instrument is transported it becomes essential to remove temporarily the liquid from the dashpot (usually a difficult task) and to handle it in a separate container. It must then be returned to the dashpot before the damping device is ready for use.

The present invention has for an object the provision of a damping device in which a high damping coefficient may be obtained in a dashpot or the like, having relatively small dimensions, and without resort to small clearance or to the use of a high-viscosity liquid.

A further object is to provide a dashpot from which a contained liquid may not readily be spilled when in use; and which dashpot, furthermore, may be effectively sealed to permit handling and shipment.

In carrying out the invention, a suitable container for liquid is provided, the same embodying internal stationary wall portions adapted to cooperate with movable wall portions coaxial therewith and constituting a plunger member which is movable within the said container by the moving element of the measuring instrument or the like, the wall portions of the plunger being interleaved with the wall portions of the container to provide therewith a labyrinthine passage for liquid retained by said container.

Provision is made, furthermore, for accommodating the liquid of the container by providing at its entrance an enlarged portion of a capacity to accommodate the operative liquid in any position that the container may assume, the enlarged portion to this end having its edge turned inwardly. There may be provided over this edge, also, a resilient sealing washer or the like adapted for contact with the outer end of the plunger when the latter is drawn upwardly to seal thereby the entrance portion.

The nature of the invention, however, will best be understood when described in connection with the accompanying drawing, in which:

Fig. 1 is a half front elevation and a half vertical section of the novel damping device.

Fig. 2 is a transverse section thereof taken on the line 2—2, Fig. 1.

Fig. 3 is a fragmentary enlarged elevation showing means for connecting the plunger member of the damping device to an instrument moving element and of supporting the same in a manner to seal the container of the damping device.

Fig. 4 is a part vertical section and part side view thereof.

Fig. 5 is a half plan and half transverse section illustrating a modification.

Referring to the drawing, 10 designates a containing vessel or dashpot, which may be formed of glass, metal or other suitable material. This vessel consists of a lower cylindrical portion 11, and an enlarged upper portion 12, having an inturned edge 13 at the entrance to the vessel. Coaxially fixed within the portion 11 may be located one or more wall portions as afforded by a cylindrical cup 14, for example, of a diameter approximating half that of the portion 11 and the cup extending upwardly from the bottom of the dashpot.

A plunger element or piston 15, built up of two coaxial cup portions or tubular sections 16 and 17 closed at the outer ends, is supported by a slender rod or stem 18 within the portion 11 of the container 10. The diameters of the said tubular portions 16 and 17 are so chosen that their sections alternate with those of the portion 11 of the container and the cup 14 straddling the latter and affording substantially uniform clearance on all sides.

In operation the vessel 10 contains a damping fluid, such as air, or, preferably, a liquid as oil of a medium degree of viscosity and of a sufficient quantity to immerse the plunger 15 totally when in its topmost operating position. As the plunger is lowered into the section 11 of the containing vessel, some of the fluid which is contained within the cup 14 will be forced into the cup 16, and, together with some of that already in the cup 16, will be forced into the body of the container.

As the fluid flows through the spaces between the several cup sections, it meets with a relatively high resistance due to the length of the passages as compared with their cross-sectional area, thus greatly increasing the damping effect over that obtainable from a simple piston or a plain cylindrical plunger of similar over-all dimensions.

It will be noted, moreover, as the plunger is forced further and further into the vessel, that the frictional resistance, and hence the damping effect, will be increased due to the decreasing cross-sections of the outflow spaces. In electrical instruments, where the torque-gradient is generally greater at one end of the excursion of the moving element than at the other, this feature may be made use of to promote uniform action throughout the scale. It will also be evident that upon withdrawing the plunger from the containing vessel, the fluid will return to the interior spaces and will meet with frictional resistance similar to that when the plunger was depressed.

In order to prevent the formation of air bubbles beneath the plunger 15 when a liquid is utilized, small holes or vents 19 may be formed in its upper surface. These will allow the escape of entrapped air, and at the same time may be made so small that they will not permit the flow of sufficient oil to affect the damping action.

The enlarged section 12 tends to prevent slopping of the contained liquid, and it may be made of such dimensions that, when the vessel is turned upon its side for example, it will accommodate the quantity of liquid necessary for effective damping, preventing any spillage when in that position. Moreover, by extending the inturned lip 13 downwardly into the vessel, the capacity of the annular space normally at the top of the container may be made such that when the vessel is entirely inverted none of the liquid will be spilled.

As an additional precaution against spilling of the liquid in handling, the inturned edge 13 may be fitted with a resilient washer 20 formed to engage the said inturned edge and also to provide a bearing surface against which may rest the upper surface of the plunger when it is elevated to its topmost position. Thus the container may be sealed against possible spilling of the damping liquid, however it may be handled.

In assembling this part of the device, the washer, being formed of a highly resilient material, may be folded and inserted within the opening of the vessel after the plunger is in place, and then manipulated to its proper location in engagement with the lower face of the inturned edge and, if necessary, cemented thereto by an oilproof cement.

In normal operation, the plunger element is supported from a bearing consisting of a hardened metal ring 21, having therethrough an opening 22, countersunk from both sides, to provide a knife-edge bearing surface. The suspending rod 18 at its upper end is formed into a hook 23, which engages a groove in the outer surface of the ring 21 by spring action, but is readily removed therefrom by forcing the jaws of the hook apart. The ring 21 is carried upon a screw 24 having a supporting surface formed of two opposed cones constituting an angle substantially greater than that of the knife-edge bearing surface within the ring. The screw 24, moreover, is threaded at its inner end to enter the end of an arm 25 mounted on the horizontally disposed shaft 26 of the moving element 27 of the mechanism to be damped; and its head is made larger in diameter than the aperture 22 in the ring 21, so that when the screw is seated in the arm 25, the ring cannot be removed. At the same time, it has free play, with a knife-edge action as the arm swings through a limited angle about the center line of the mechanism.

When it is desired to prepare the instrument for shipment, the hook 23 on the rod 18 is disengaged from the ring 21 and lifted to a position where the plunger 15 is firmly pressed against the lower side of the resilient washer 20, as indicated by the dotted line position, Fig. 1. It is then secured to a peg, hook or abutment 28 on the frame 29 of the instrument, thus retaining the dashpot in its sealed condition.

In Fig. 5 is shown the application of the principle of the invention to a damping member adapted for rotary, rather than a reciprocatory, movement of the plunger. Arcuate vanes 30 are to this end fixed to the base of the cup, and alternating with them are arcuate movable vanes 31, carried by, and forming a part of, plungers 32. These plungers are adapted, through spindle 33 attached thereto, for rotary motion within the cup about a limited angle corresponding to the working angle of deflection of the mechanism (not shown) whose oscillations are to be damped. The general conformation of the containing vessel is substantially identical with that shown for a reciprocatory plunger, and the operating principle of the damping action is identical therewith.

I claim:

1. A damping device for instruments having a moving element, comprising a container for a fluid and embodying stationary wall portions, a hollow plunger member movable therein by the moving element and having wall portions parallel to and cooperating with the said stationary wall portion to provide therewith a labyrinthine passage for fluid retained within the container, a stem supporting the plunger, a support for the stem, and resilient means to removably secure the stem to the support.

2. A damping device for instruments having a moving element, comprising a container for a liquid and embodying stationary wall portions, and a hollow plunger member movable therein by the moving element and having wall portions parallel to and cooperating with the said stationary wall portion to provide therewith a labyrinthine passage for liquid retained within the container, the container being provided at its entrance with an enlarged portion having an inturned edge, the capacity of said enlarged portion being so related to the capacity of the container operative portion as to accommodate the liquid retained by the latter in any position of said container, and means including the inturned edge of said enlarged portion, together with means carried over said edge, for contacting the top of the plunger to seal the container against spilling of liquid contained therein, and means to maintain temporarily said contact.

3. A damping device for instruments having a moving element, comprising a container for a liquid, and a plunger member movable therein by the moving element, and the container being provided at its entrance with an enlarged portion having an inturned edge, the capacity of said enlarged portion being so related to the capacity of the container operative portion as to accommodate the liquid retained by the latter in any position of said container, resilient means associated with the edge of the enlarged portion for sealing the container against spilling of liquid contained therein, and means to retain temporarily the upper end of the plunger in contact with the resilient sealing means for sealing the container against escape of liquid contained therein.

4. A damping device for instruments having a moving element, comprising a container for a liquid and embodying stationary wall portions, and a hollow plunger member movable therein by the moving element and having wall portions parallel to and cooperating with the said stationary wall portion to provide therewith a labyrinthine passage for liquid retained within the container, and the container being provided at its entrance with an enlarged portion having an inturned edge, the capacity of said enlarged portion being so related to the capacity of the container operative portion as to accommodate the liquid retained by the latter in any position of said container, resilient means associated with the edge of the enlarged portion for sealing the container against spilling of liquid contained therein, and means to retain temporarily the upper end of the plunger in contact with the resilient sealing means for sealing the container against escape of liquid contained therein.

5. A damping device for instruments having a moving element, comprising a container for a liquid and embodying stationary wall portions, and a hollow plunger member closed at its outer end and movable therein by the moving element and having wall portions parallel to and cooperating with the said stationary wall portion to provide therewith a labyrinthine passage for liquid retained within the container and within which the plunger is wholly submerged, there being openings provided in the closure to the said passage whereby air bubbles may be eliminated from the confined liquid.

PERRY A. BORDEN.